United States Patent [19]

Dolan et al.

[11] 4,013,586

[45] Mar. 22, 1977

[54] VANADIUM CATALYSTS PREPARED WITH PHOSPHONATES

[75] Inventors: Thomas J. Dolan, Arnold; Robert S. Mitchell, Webster Groves, both of Mo.

[73] Assignee: Monsanto Company, St. Louis, Mo.

[22] Filed: July 24, 1975

[21] Appl. No.: 598,615

[52] U.S. Cl. .............................. 252/437; 252/435; 260/346.8 R

[51] Int. Cl.² ..................... B01J 27/18; B01J 37/00

[58] Field of Search ........................... 252/435, 437

[56] References Cited

UNITED STATES PATENTS

| | | | |
|---|---|---|---|
| 2,773,921 | 12/1956 | Rylander et al. | 252/435 X |
| 3,031,508 | 4/1962 | Etherington et al. | 252/437 X |
| 3,156,707 | 11/1964 | Kerr | 252/437 X |
| 3,474,041 | 10/1969 | Kerr | 252/435 X |
| 3,845,094 | 10/1974 | Angstadt | 252/437 X |
| 3,907,707 | 9/1975 | Raffelson et al. | 252/437 |

*Primary Examiner*—Patrick P. Garvin
*Attorney, Agent, or Firm*—N. E. Willis; H. B. Roberts; F. D. Shearin

[57] ABSTRACT

An improved process was found for preparing a vanadium-containing catalyst wherein a tetravalent vanadium compound is provided from a pentavalent vanadium compound, comprising contacting the pentavalent vanadium compound with a phosphonate. The improved process is exemplified by the preparation of phosphorus-vanadium-oxygen catalysts, and particularly the preparation of phosphorus-vanadium-oxygen catalysts having a phosphorus to vanadium atom ratio of about 1:2 to about 2:1 comprising contacting a vanadium compound with a selected phosphonate, recovering a phosphorus-vanadium-oxygen precursor, and thereafter calcining the precursor to form the catalysts. The compound 1-hydroxy-1,1-ethylidene diphosphonic acid is preferred as the phosphonate.

11 Claims, No Drawings

VANADIUM CATALYSTS PREPARED WITH PHOSPHONATES

BACKGROUND OF THE INVENTION

This invention relates to phosphorus-vanadium-oxygen catalysts, and particularly to such catalysts containing tetravalent vanadium. The invention is exemplified by phosphorus-vanadium-oxygen catalysts useful for the manufacture of dicarboxylic acid anhydrides by the oxidation of hydrocarbons, and especially for producing maleic anhydride from saturated hydrocarbons, such as butane.

Maleic anhydride is of significant commercial interest throughout the world. It is used alone or in combination with other acids in the manufacture of alkyd and polyester resins. It is also a versatile intermediate for chemical synthesis. Significant quantities of maleic anhydride are produced each year to satisfy these needs.

The prior art teaches that vanadium catalysts are well suited to the production of maleic anhydride from hydrocarbons, usually unsaturated hydrocarbons, and the prior art further teaches that phosphorus-vanadium-oxygen catalysts can be prepared in a number of ways. For example, these catalysts can be prepared by precipitating the vanadium and phosphorus compounds either with or without a carrier from a colloidal dispersion of the ingredients in an inert liquid, and thereafter calcining the precipitate. Catalysts can also be prepared by dissolving vanadium and phosphorus compounds in a common solvent and thereafter depositing the resulting phosphorus-vanadium-oxygen compound from solution on a carrier.

Many prior art procedures for the preparation of vanadium catalysts teach that it is preferable to reduce the vanadium in solution to the tetravalent state. Hence, the prior art teaches that vanadium compounds can be contacted with a reducing acid such as hydrochloric acid or oxalic acid, and then heated until the vanadium is reduced to a valence state of less than five before the compounds are subsequently recovered and used as catalysts.

Although the prior art procedures provide acceptable catalysts, there are attendant processing difficulties with such procedures. As an example, when oxalic acid is used to provide tetravalent vanadium in a phosphorus-vanadium-oxygen catalyst, copious quantities of undesirable oxalate decomposition products are produced, and such oxalate decomposition products are frequently difficult to dispose of by conventional processing equipment. On the other hand, when hydrochloric acid is used to provide such tetravalent vanadium, chlorine and hydrochloric acid are evolved during the heating steps, and can be highly corrosive to the processing equipment used to prepare the catalyst.

These and other disadvantages of the prior art are overcome by the present process for preparing vanadium-containing catalysts which involves the use of a phosphonate compound to provide tetravalent vanadium. It was surprising that phosphonate compounds, which are generally considered to contain pentavalent phosphorus based on their structural formulae, could be used to provide tetravalent vanadium from pentavalent vanadium under conditions that form a phosphorus-vanadium-oxygen catalyst precursor.

SUMMARY OF THE INVENTION

It is an object of this invention to provide an improved process for the preparation of phosphorus-vanadium-oxygen catalysts. It is another object to provide a process for preparing improved phosphorus-vanadium-oxygen catalysts suitable for converting non-aromatic hydrocarbons to maleic anhydride. It is another object to provide a process for preparing improved phosphorus-vanadium-oxygen catalysts particularly suitable for converting butane to maleic anhydride.

These and other objects are met in a process for preparing a phosphorus-vanadium-oxygen catalyst wherein a pentavalent vanadium compound is contacted with a phosphorus compound under conditions to provide a substantial amount of tetravalent vanadium and to form a phosphorus-vanadium-oxygen precursor, the improvement which comprises contacting the pentavalent vanadium compound with a phosphonate selected from the group consisting of amino tri(-lower alkylidene phosphonic acid); lower alkylidene diphosphonic acids; and condensed polyalkylene-polyamine derivatives.

Broadly described, the catalysts of this invention are prepared by contacting a pentavalent vanadium compound with a phosphonate, preferably in the presence of additional phosphorus compound to provide a phosphorus to vanadium atom ratio of between about 0.05:1 and about 3:1, to provide a phosphorus-vanadium-oxygen catalyst precursor containing a substantial amount of tetravalent vanadium, recovering the catalyst precursor and calcining the catalyst precursor to form the catalysts.

For the purposes of this invention, the term "catalytic activity" means the ability of a catalyst to convert a particular feed stock such as butane at a particular temperature to other compounds. The term "selectivity" means the ratio of the moles of maleic anhydride obtained to the moles of hydrocarbon reacted. The term "yield" means the ratio of the moles of maleic anhydride obtained to the moles of hydrocarbon introduced into the reaction. The term "space velocity" means the hourly volume of gaseous feed expressed in cubic centimeters (cc) at 60° F. and standard atmospheric pressure divided by the catalyst bulk volume expressed in cubic centimeters (cc), the term being expressed as cc/cc/hour.

The vanadium compounds useful as a source of vanadium in the catalyst precursors are those known to the art to be useful for preparing catalysts to oxidize hydrocarbons. Suitable vanadium compounds include: vanadium oxides such as vanadium pentoxide and the like; vanadium oxyhalides such as vanadyl trichloride, vanadyl tribromide and the like; vanadium-containing acids such as metavanadic acid, pyrovanadic acid, and the like; vanadium salts such as ammonium metavanadate, vanadium sulfate, vanadium phosphate, vanadyl formate, vanadyl oxalate and the like. However, vanadium pentoxide is preferred.

The phosphonate compounds useful to provide a substantial amount of tetravalent vanadium in the catalyst precursors are those known to the art. Suitable phosphonate compounds include amino tri(lower alkylidene phosphonic acid) compounds and their salts having the following formula:

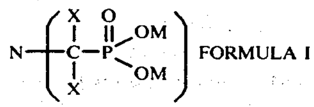

where each X is selected from the group consisting of hydrogen and lower alkyls containing 1 to 4 carbon atoms, and M is a member selected from the group consisting of hydrogen and cations. Amino tri(lower alkylidene phosphonic acid) compounds illustrative of those falling within Formula I above include:

1. amino tri(methylene phosphonic acid)
2. amino tri(ethylidene phosphonic acid)
3. amino tri(isopropylidene phosphonic acid)
4. amino di(methylene phosphonic acid) mono(ethylidene phosphonic acid)
5. amino di(methylene phosphonic acid) mono(isopropylidene phosphonic acid)
6. amino mono(methylene phosphonic acid) di(ethylidene phosphonic acid)
7. amino mono(methylene phosphonic acid) di(isopropylidene phosphonic acid)

Of the amino tri(alkylidene phosphonic acid) compounds amino tri(methylene phosphonic acid) is preferred.

Other suitable phosphonate compounds include the lower alkylidene diphosphonic acid compounds having the following formula:

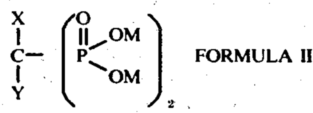

wherein X is a member selected from the group consisting of hydrogen and lower alkyl (1–4 carbon atoms) and Y is a member selected from the group consisting of hydrogen, hydroxyl and lower alkyl (1–4 carbon atoms), and M is a member selected from the group consisting of hydrogen and cations. Such lower alkylidene diphosphonic acid compounds illustrative of those falling within Formula II above include:

1. methylene diphosphonic acid
2. ethylidene diphosphonic acid
3. isopropylidene diphosphonic acid
4. 1-hydroxy, ethylidene diphosphonic acid
5. 1-hydroxy, propylidene diphosphonic acid
6. butylidene diphosphonic acid Of the lower alkylidene diphosphonic acid compounds, 1-hydroxy, ethylidene diphosphonic acid is preferred.

In addition to the above phosphonate compounds, any number of condensed polyalkylene-polyamine derivatives, according to the following formula, have been found useful:

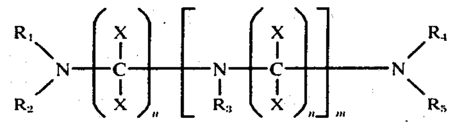

FORMULA III wherein each X is selected from the group consisting of hydrogen and lower alkyls containing 1 to 4 carbon atoms; *n* is either 2 or 3; *m* is 0 to 12; $R_3$ is selected from the group consisting of hydrogen, lower alkyl containing 1 to 4 carbon atoms and $—CH_2PO_3M$ group; $R_1$, $R_2$, $R_4$ and $R_5$ are from the group of radicals

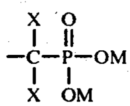

FORMULA IV

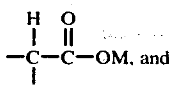

FORMULA V

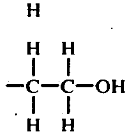

FORMULA VI with the proviso that at least two $—C(X)(X)PO_3M_2$ groups are present at all times and are either $R_1$ and $R_2$ or $R_4$ and $R_5$. In the above formulas, M is hydrogen or any cation which is desirable to incorporate into the phosphorus-vanadium-oxygen catalyst, such as lithium, sodium, potassium, alkaline earth metals such as calcium or magnesium, transition elements, zinc or the like, to act as a catalyst promoter. However, hydrogen is preferred since it is easier to incorporate minor amounts of a catalyst promoter as a separate step in the preparation of the catalyst. The phosphonate compounds of Formula III wherein M is 0 to 6 are preferred.

It is to be understood that the term "phosphonate compound" as used in this specification and in the claims appended hereto means those acids and salts set forth above in Formulas I, II and III.

To determine whether phosphonate compounds such as a polyalkylene-polyamine derivative represented by Formula III, are suitable for the preparation of phosphorus-vanadium-oxygen catalysts, such phosphonate compound need only be tested by the "vanadium reducing test" hereinafter described. A small amount of water, say about 5 milliliters, is placed in a suitable container, such as a small beaker or test tube. Then, about one gram of vanadium pentoxide and about one gram of phosphonate compound is added to the water, and the mixture is heated to boiling for about five minutes. A blue solution obtained after heating for five minutes indicates the presence of tetravalent vanadium, and indicates that the phosphonate compound would be satisfactory for preparing the phosphorus-vanadium-oxygen catalysts by the process of the present invention. By this test, phosphonate compounds such as 1-hydroxy ethylidene-1,1 diphosphonic acid, amino tri(methylene phosphonic acid), ethylene-diamine tetra(methylene phosphonic acid), and diethylenetriamine penta(methylene phosphonic acid) reduced pentavalent vanadium by the vanadium reducing test described above, and are satisfactory for use in preparing phosphorus-vanadium-oxygen catalysts by the process of the present invention. On the other hand, compounds such as hexamethylenediamine tetra(methylene phosphonic acid), and dodecylamine bis(methylene phosphonic acid) do not reduce pentavalent vanadium by the vanadium reducing test described above, and are not satisfactory for use in preparing phosphorus-vanadium-oxygen catalysts by the process of the present invention, although their presence during the preparation of such catalysts is not harmful.

The phosphonate compounds set forth above can be made by methods known to those skilled in the art, such as those disclosed in U.S. Pat. No. 2,599,807; U.S. Pat. No. 3,288,846; U.S. Pat. No. 3,504,018 and U.S. patent application Ser. No. 160,545 filed July 7, 1971, now abandoned. Broadly described, nitrogen-containing phosphonate compounds are prepared by reacting together (a) a phosphorus-containing material such as orthophosphorus acid, a combination of phosphorus trichloride and water, or a dialkyl phosphite ester, (b) an aldehyde, such as formaldehyde, and (c) an amine, such as ethylenediamine or diethylene triamine and the like, in relative proportions, preferably in an acidic aqueous medium, at an elevated temperature, say about 60° C., for a sufficient time to achieve the desired reaction. Phosphonate compounds that do not contain nitrogen, such as those of Formula II above, can be prepared by methods known to those skilled in the art, such as those disclosed in U.S. Pat. No. 3,551,480. Broadly described, such compounds are prepared by reacting phosphorus acid with aliphatic carboxylic acid anhydrides or chlorides or $PCl_3$ with the corresponding carboxylic acid, at 80° – 200° C.

As an additional source of phosphorus in the catalyst precursors, pentavalent phosphorus compounds known to the art to be useful for preparing catalysts to oxidize hydrocarbons can be used. Suitable pentavalent phosphorus compounds include: phosphoric acids such as metaphosphoric acid, orthophosphoric acid, triphosphoric acid, pyrophosphoric acid and the like; phosphorus oxides such as phosphorus pentoxide and the like; phosphorus halides such as phosphorus oxyiodide, phosphorus pentachloride, phosphorus oxybromide and the like; and organophosphorous compounds such as ethyl phosphate, methyl phosphate and the like. However, phosphoric acids, such as orthophosphoric acid, and phosphorus pentoxide are preferred.

To prepare the catalyst precursors by the process of the present invention, a predetermined amount of vanadium compound in which the vanadium is in the pentavalent state is contacted in an acid medium with a sufficient amount of phosphorate compound to provide a substantial amount, i.e., at least 50 atom percent, of tetravalent vanadium. It is preferable to use a stoichiometric amount of phosphonate compound to provide tetravalent vanadium, and even more preferable to use an excess of the stoichiometric amount of phosphonate compound to insure that substantially all the vanadium is in the tetravalent state. It is preferred to use 1 hydroxy-1,1-ethylidene diphosphonic acid as the phosphonate compound which provides the precursor and provides the tetravalent vanadium. The mixture of phosphonate compound and the vanadium compound are heated until a blue solution is obtained, indicating that a substantial amount of the vanadium is in the tetravalent state. The amount of time required to provide a substantial amount of the vanadium in the tetravalent state to form the catalyst precursors varies from batch to batch, depending upon the compounds used as starting materials and the temperatures at which the compounds are heated. However, as will occur to those skilled in the art, an aliquot can be analyzed to insure that a major part of the vanadium is in the tetravalent state. In general, however, heating the mixture to about 100° C. for about four hours is sufficient.

The atom ratio of phosphorus to vanadium in the precursor is important since it controls the phosphorus to vanadium atom ratio in the final catalyst. When phosphorus-vanadium-oxygen precursors contain a phosphorus to vanadium atom ratio below about 1:2 or above about 2:1, the yield of maleic anhydride using the catalyst prepared from these precursors is so low that it is not of commercial significance. It is preferred that phosphorus-vanadium-oxygen precursors have a phosphorus to vanadium atom ratio in the range of about 1:1 to about 1.5:1. When the catalyst is used to convert a feed that is primarily butane to maleic anydride, it is even more preferable that the precursor have a phosphorus to vanadium atom ratio of about 1:1 to about 1.2:1, say about 1.1:1.

In addition to the phosphonate compounds, additional phosphorus may be used to achieve the desired phosphorus to vanadium atom ratio in the phosphorus-vanadium-oxygen precursors. While phosphonate compounds can be used as the only source of phosphorus, pentavalent phosphorus compounds can be used as an additional source of phosphorus and their use with the phosphonate compounds is preferred.

After the vanadium and phosphorus compounds are mixed and a substantial amount of the vanadium is in the tetravalent state, it is necessary to recover the phosphorus-vanadium-oxygen precursors. Techniques for recovering the phosphorus-vanadium-oxygen precursors are well known to those skilled in the art. For example, the precursors can be deposited from aqueous solution on a carrier, such as alumina or titania, or the precursors can be dried by gentle heating to provide solid phosphorus-vanadium-oxygen precursors.

After the phosphorus-vanadium-oxygen precursors are recovered, they aae then formed into structures suitable for use in a maleic anhydride reactor. Techniques for forming appropriate structures from precursors for use in a fluidized bed reactor or in a fixed tube heat exchanger type reactor are well known to those skilled in the art. For example, the precursors can be structured for use in a fluidized bed reactor by depositing the phosphorus-vanadium-oxygen precursors on a carrier. Alternatively, dried precursors can be comminuted for use in a fluidized bed reactor. On the other hand, precursors can be structured for use in a fixed tube reactor by prilling or tabletting the precursors.

After the phosphorus-vanadium-oxygen precursors are formed into the structures which will be used in a maleic anhydride reactor, the precursors are then calcined in an inert atmosphere, such as nitrogen or a noble gas, at temperatures of about 350° C. to about 600° C. for at least about 2 hours, to provide the catalysts of the present invention.

However, for those phosphorus-vanadium-oxygen precursors having a phosphorus to vanadium atom ratio of greater than 1:1, it is preferred to convert part of the tetravalent vanadium to pentavalent vanadium during the calcination step. The tetravalent vanadium can be converted to pentavalent vanadium by calcining the precursor in air at temperatures of about 350° C. to about 600° C. until about 20 to about 80 atom percent of the vanadium has been converted to pentavalent vanadium. If more than about 80 atom percent of the vanadium is converted to pentavalent vanadium, usually caused by calcining too long or at too high a temperature, the selectivity of the resultant catalyst and the yield of maleic anhydride decrease markedly. On the other hand, conversion of less than about 20 atom percent of the vanadium during air calcination does not seem to be more beneficial than calcination in an inert atmosphere. It has been found that calcination at 500° C. for about 4 hours is generally sufficient.

After the phosphorus-vanadium-oxygen precursor has been calcined, the catalyst thus formed is placed in a reactor used to convert hydrocarbons to maleic anydride. Thereafter, a hydrocarbon and air mixture can be passed through the catalyst at temperatures between about 350° C. and 600° C. at concentrations of from about 1 to about 10 mole percent hydrocarbon at a space velocity up to 3000 cc/cc/hour to produce maleic anhydride.

However, as is well known in the art, the initial yield of maleic anhydride may be low, and if this is the case, the catalyst can be "conditioned" by passing low concentrations of hydrocarbon in air at low space velocities through the catalyst for a period of time before production operations begin.

The catalysts of the present invention are useful in a variety of reactors to convert hydrocarbons to maleic anhydride. Both fluidized bed reactors and fixed tube heat exchanger type reactors are satisfactory and the details of the operation of such reactors are well known to those skilled in the art. The reaction to convert hydrocarbons to maleic anydride requires only passing the hydrocarbons admixed with a free oxygen-containing gas, such as air or oxygen-enriched air, through the catalyst at elevated temperatures. The hydrocarbon-air mixture is passed through the catalysts at a concentration of about 1 to about 10 mole percent hydrocarbon at a space velocity of about 100 to 3000 cc/cc/hour and at temperatures between about 350° C. and about 600° C. to provide high maleic anhydride yields.

Maleic anhydride produced by using the catalysts of this invention can be recovered by any number of means well known to those skilled in the art. For example, the maleic anhydride can be recovered by direct condensation or by absorption in suitable media with subsequent separation and purification of the anhydride.

A large number of non-aromatic hydrocarbons having from 4 to 10 carbon atoms can be converted to maleic anhydride using the catalysts of the present invention. It is only necessary that the hydrocarbon contain not less than 4 carbon atoms in a straight chain. As an example, the preferred saturated hydrocarbon is butane, but isobutane which does not contain 4 carbon atoms in a straight chain, is not satisfactory for conversion to maleic anhydride although its presence is not harmful. In addition to butane, other saturated hydrocarbons within the scope of this invention include the pentanes, the hexanes, the heptanes, the octanes, the nonanes, the decanes or mixtures of any of these with or without butane. In addition to the saturated hydrocarbons, unsaturated hydrocarbons can be used. The preferred unsaturated hydrocarbon is butene, but other unsaturated hydrocarbons within the scope of this invention include butadiene, the pentenes, the hexenes, the heptenes, the octenes, the nonenes, the decenes, or mixtures of any of these with or without butene. Cyclic compounds such as cyclopentane or cyclopentene or oxygenated compounds such as furan, dihydrofuran or tetrahydrofurfural alcohol are satisfactory. Furthermore, the aforementioned feed stocks are not necessarily pure substances, but can be technical hydrocarbons.

This invention is illustrated by, but not limited to, the following Examples.

EXAMPLE I

This Example illustrates the reduction of vanadium pentoxide to tetravalent vanadium using amino tri(-methylene phosphonic acid), useful for the preparation of phosphorus-vanadium-oxygen catalysts.

To about 5 milliliters of distilled water was added 1 gram of vanadium pentoxide and 1.1 grams of amino tri(methylene phosphonic acid). After heating the mixture for about five minutes at about 100° C., a deep blue color was obtained indicating the presence of tetravalent vanadium.

EXAMPLE II

This Example illustrates the usefulness of ethylenediamine tetra(methylene phosphonic acid) to reduce pentavalent vanadium to tetravalent vanadium useful for the preparation of phosphorus-vanadium-oxygen catalysts.

The procedure of Example I was repeated except that 2 grams of ethylenediamine tetra(methylene phosphonic acid) was used. The blue solution that was obtained after heating five minutes at about 100° C. indicated the formation of tetravalent vanadium.

EXAMPLE III

This Example illustrates the usefulness of diethylene triamine penta(methylene phosphonic acid) to reduce pentavalent vanadium to tetravalent vanadium suitable for the preparation of phosphorus-vanadium-oxygen catalysts.

The procedure of Example I was repeated except that 4 grams of diethylene triamine penta(methylene phosphonic acid) was used to reduce the vanadium. After heating the mixture for about five minutes at about 100° C. a blue-green solution was obtained indicating the formation of tetravalent vanadium suitable for the preparation of phosphorus-vanadium-oxygen catalysts.

Thus, it can be seen that one embodiment of this invention comprises a process for reducing ions having an oxidation-reduction potential about equal to or less than pentavalent vanadium by contacting such ions with a phosphonate compound.

EXAMPLE IV

This Example illustrates the preparation of phosphorus-vanadium-oxygen catalysts by the process of the present invention for use in a fixed bed reactor.

A phosphorus-vanadium-oxygen catalyst was prepared by slurrying together 10.3 grams (0.11 mole) of 1-hydroxy ethylidene 1,1-diphosphonic acid with about 10.9 grams (about 0.2 mole) of vanadium pentoxide, 69 grams (0.2 mole) of 85 percent phosphoric acid, and 300 milliliters of tetrahydrofuran in a 1-liter flask. The flask and the contents were heated to reflux temperature (about 66° C.) while about 400 milliliters of water were added dropwise. The tetrahydrofuran was stripped off during which a color change took place from yellow to dark blue, indicating the presence of tetravalent vanadium. The material was transferred to an evaporating dish and dried in an oven at 100° C. The resulting solids were reslurried in about 20 weight percent water, based on the weight of the solids, to form a viscous putty which was then extruded through a 5.5 millimeter orifice. The extrudate was then cut into pellets of about 5.5 milliliters long. The putty pellets were then allowed to air dry and heated to about 90° C. in an oven to evaporate any remaining water. The pellets were then calcined at about 250° C. in air for two hours and then calcined at about 400° C. in nitrogen for four hours to form a phosphorus-vanadium-oxygen catalyst.

The catalyst pellets were then charged to a 1-inch outside diameter, fixed bed glass reactor, which gives results comparable to those obtained in a production reactor. Maleic anhydride was produced using a 1.5 mole percent butane-in-air mixture at a space velocity of about 1300 cc/cc/hr. at 487° C. The yield of maleic anhydride was about 41.6 mole percent.

Using the same catalyst, maleic anhydride was produced using a 2.5 mole percent butane-in-air mixture at a space velocity of 1300 cc/cc/hr. at 520° C. The yield of maleic anhydride was about 26.8 mole percent.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. In a process for preparing a phosphorus-vanadium-oxygen catalyst wherein a pentavalent vanadium compound is contacted with a phosphorus compound under conditions to provide a substantial amount of tetravalent vanadium and to for a phosphorus-vanadium-oxygen precursor, the improvement which comprises contacting the pentavalent vanadium compound with a phosphonate compound selected from the group consisting of:

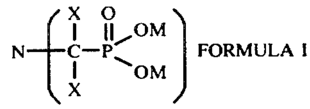

where each X is selected from the group consisting of hydrogen and lower alkyls containing 1 to 4 carbon atoms and M is a member selected from the group consisting of hydrogen and cations;

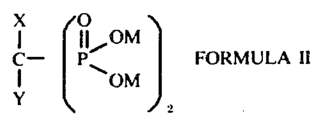

wherein X is a member selected from the group consisting of hydrogen and lower alkyl (1–4 carbon atoms) and Y is a member selected from the group consisting of hydrogen, hydroxyl and lower alkyl (1–4 carbon atoms), and M is a member selected from the group consisting of hydrogen and cations; and

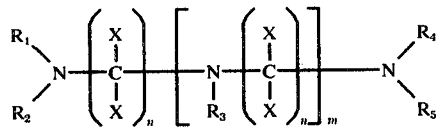
FORMULA III wherein each X is selected from the group consisting of hydrogen and lower alkyls containing 1 to 4 carbon atoms; $n$ is either 2 or 3; $m$ is 0 to 12; $R_3$ is selected from the group consisting of hydrogen, lower alkyl containing 1 to 4 carbon atoms and $—CH_2PO_2M$ group; $R_1$, $R_2$, $R_4$ and $R_5$ are from the group of radicals

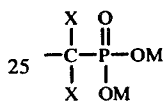
FORMULA IV

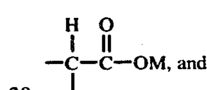
FORMULA V

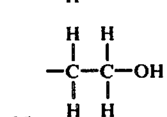
FORMULA VI with the proviso that at least two $—C(X)(X)PO_3M_2$ groups are present at all times and are either $R_1$ and $R_2$ or $R_4$ and $R_5$ and that the compound gives a positive result with the vanadium reducing test.

2. In a process of claim 1 wherein the phosphonate compound is a condensed polyalkylene-polyamine derivative represented by Formula III and $n$ is 2.

3. In a process of claim 2 wherein $m$ is 0 to 6.

4. In a process of claim 1 wherein the phosphorus to vanadium atom ratio is about 1:1 to about 2:1.

5. In a process of claim 1 wherein the phosphorus to vanadium atom ratio is about 1:1 to about 1.1:1.

6. In a process of claim 1 wherein the phosphorus to vanadium atom ratio is about 1.1:1.

7. In a process of claim 1 wherein the amount of phosphonate compound is at least the stoichiometric amount required to provide tetravalent vanadium.

8. In a process of claim 1 wherein the phosphonate compound is amino tri(methylene phosphonic acid).

9. In a process of claim 1 wherein the phosphonate compound is 1-hydroxy ethylidene 1,1-diphosphonic acid.

10. In a process of claim 1 wherein the phosphonate compound is ethylenediamine tetra(methylene phosphonic acid).

11. In a process of claim 1 wherein the phosphonate compound is diethylenetriamine penta(methylene phosphonic acid).

* * * * *

UNITED STATES PATENT OFFICE
CERTIFICATE OF CORRECTION

PATENT NO. : 4,013,586

DATED : March 22, 1977

INVENTOR(S) : Thomas J. Dolan and Robert S. Mitchell

It is certified that error appears in the above-identified patent and that said Letters Patent are hereby corrected as shown below:

In Claim 1, Column 9, at line 5, "for" should read --form--; Column 9, Formula I:

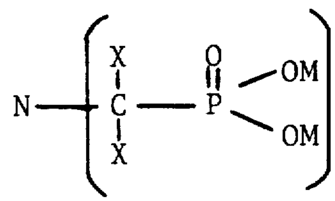

should read:

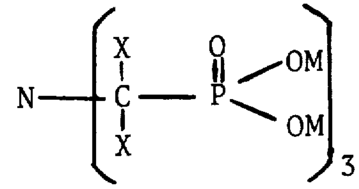

Signed and Sealed this

Twenty-fourth Day of May 1977

[SEAL]

*Attest:*

RUTH C. MASON
*Attesting Officer*

C. MARSHALL DANN
*Commissioner of Patents and Trademarks*